United States Patent [19]
Wenzel

[11] Patent Number: 4,628,570
[45] Date of Patent: Dec. 16, 1986

[54] DEVICE FOR PROCESSING FILLETS OF FISH

[75] Inventor: Werner Wenzel, Lübeck, Fed. Rep. of Germany

[73] Assignee: Nordischer Maschinenbau Rud., Fed. Rep. of Germany

[21] Appl. No.: 655,542

[22] Filed: Sep. 28, 1984

[30] Foreign Application Priority Data

Oct. 5, 1983 [SE] Sweden ............................... 8305475

[51] Int. Cl.⁴ .............................................. A22C 25/17
[52] U.S. Cl. ............................................ 17/62; 17/50
[58] Field of Search .................... 11/62, 21, 55, 56, 57

[56] References Cited

U.S. PATENT DOCUMENTS 4,203,179  5/1980  Braeger ...................................... 17/62
4,466,344  8/1984  Schill ...................................... 17/62 X

FOREIGN PATENT DOCUMENTS 3014936  12/1980  Fed. Rep. of Germany .......... 17/62

Primary Examiner—Willie G. Abercrombie
Attorney, Agent, or Firm—Thomas R. Morrison

[57] ABSTRACT

In a skinning machine for double fillets of fish, in which fillets the fish strip containing the fin holders of the dorsal fins has already been separated up to the inside of the skin, a drum is arranged, against whose circumferential surface the double fillet is clamped by penetration of two round belts which surround part of the drum and penetrate into the said separation. Supported by flat belts arranged below the drum, the double fillet is guided to a triangular-shaped skinning tool held pressed against the circumferential surface, which tool severs the fillet halves from the skin.

8 Claims, 5 Drawing Figures

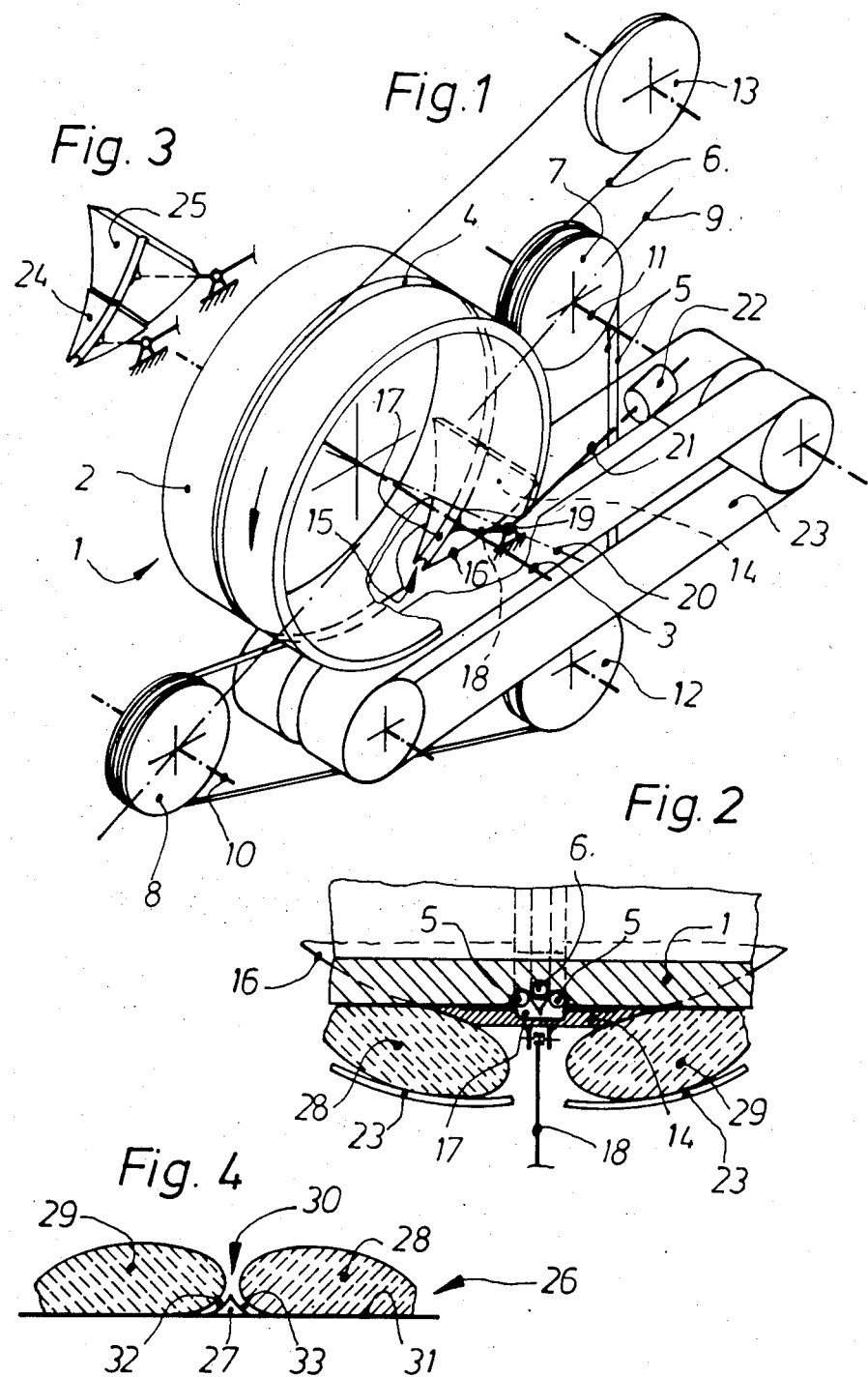

DEVICE FOR PROCESSING FILLETS OF FISH

BACKGROUND OF THE INVENTION

1. Field of the Invention

The invention concerns a device for skinning double fillets of fish, in which double fillets the flesh strip which contains the fin holders of the dorsal fins is pre-separated on both its sides up to the inner side of the skin, the device comprising a drum driven to rotate about an essentially horizontal axis and supporting the double fillets at their skin side, the circumferential surface of the drum being provided with two grooves arranged next to each other for receiving a pair of flexible holding belts surrounding a part of the circumference of the drum as well as a skinning tool fitting snugly against the circumferential surface of the drum and having cutting edges extending symmetrically to the groove at an angle opening in the direction of rotation of the drum.

2. Description of Prior Art

In a known skinning machine of this type (German Pat. No. 30 14 936) a skinning tool is used which is fixedly arranged (to the machine) and comprises a pair of skinning knives arranged in a plough-like manner relative to each other and made of narrow knife blades. With a skinning tool having these features the many demands thereon existing due to differing circumstances caused by the nature of fish, e.g. the differing thickness of the skin, the varying consistency of the skin, its adherence to the fillet flesh, etc. cannot be met, at least they make an adaptation to the raw product to be processed at the time necessary, which requires great experience and skill. Even the result which can be achieved thereby, however, is not basically satisfactory, since it is practically impossible to achieve a consistently acceptable result in an operating area limited by presorting.

3. Object of the Invention

It is therefore the object of the invention to improve the known device such that the scope of safe working conditions and function to be achieved without adapting adjustments of the tool is broadened.

SUMMARY OF THE INVENTION

In a device comprising a drum driven to rotate about an essentially horizontal axis and supporting the double fillets at their skin side, the circumferential surface of the drum being provided with two grooves arranged next to each other for receiving a pair of flexible holding belts surrounding part of the circumference of the drum as well as a skinning tool fitting snugly against the circumferential surface of the drum and having cutting edges extending symmetrically to the groove at an angle opening in the direction of rotation of the drum, this object is achieved according to the invention in that the skinning tool is held pressed radially against the circumferential surface by pressure means exerting a defined pressing force upon the skinning tool, the pressing force for the skinning tool preferably being introduced punctiformly in the skinning tool's plane of symmetry and essentially in front of its centre of gravity. The advantages achieved thereby exist especially in that the skinning tool can adapt itself freely to the varying respective circumstances. At the same time, in the initial cutting area of the skinning tool there is achieved a pressure on the circumferential surface of the drum, which pressure is higher compared to that on the other area of the skinning tool. Consequently, a safe start of the skinning cut near the pre-separated fin holder ensues.

In order to achieve an automatic adaptation of the pressure of the skinning tool on the circumferential surface of the drum, which pressure ensures the entraining of the skin and should depend on the respective skinning resistance, the skinning tool may be guided by means of a guide rod pivotal about a support mounting attached to the frame of the device, the point of engagement of the guide rod on the skinning tool lying, when seen in the direction of rotation of the drum, in front of an imaginary connecting plane extending through the axis of the drum and the support mounting of the guide rod.

When, according to a preferred embodiment of the invention, the radial pressure of the skinning tool on the circumferential surface of the drum ensues by means of a weight engaging the guide rod there is a possibility of lifting the skinning tool from the circumferential surface of the drum, e.g. for cleaning, in a simple manner.

Preferably the skinning tool may have the form of two transversely separated portions, each portion being able to be guided and held pressed against the circumferential surface of the drum on its own. It is thereby safeguarded that a reciprocal influence between the portion processing the outer parts of the fillets (belly flaps) and those processing its inner parts (back region) is avoided.

In order to remove the skin adhering spread to the circumferential surface of the drum after the skinning process the circumferential surface of the drum can be formed to receive a third round belt acting as a stripping belt, the stripping belt being guided expediently in such a manner that, together with the round belts, it forms an inlet wedge at the place at which the round belts engage the drum and that the place at which the stripping belt disengages the drum is identical to that of the round belts.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows an axonometric total view of the device according to the invention, FIG. 2 shows a cross-section through the device shown in FIG. 1 in the region of the skinning tool with a double fillet being under processing and having reached an advanced skinning state, FIG. 3 shows a further embodiment for the skinning tool, FIG. 4 shows a cross-section through a double fillet in the condition necessary for skinning in the device according to the invention.

DESCRIPTION OF THE PREFERRED EMBODIMENTS

Figure 5:
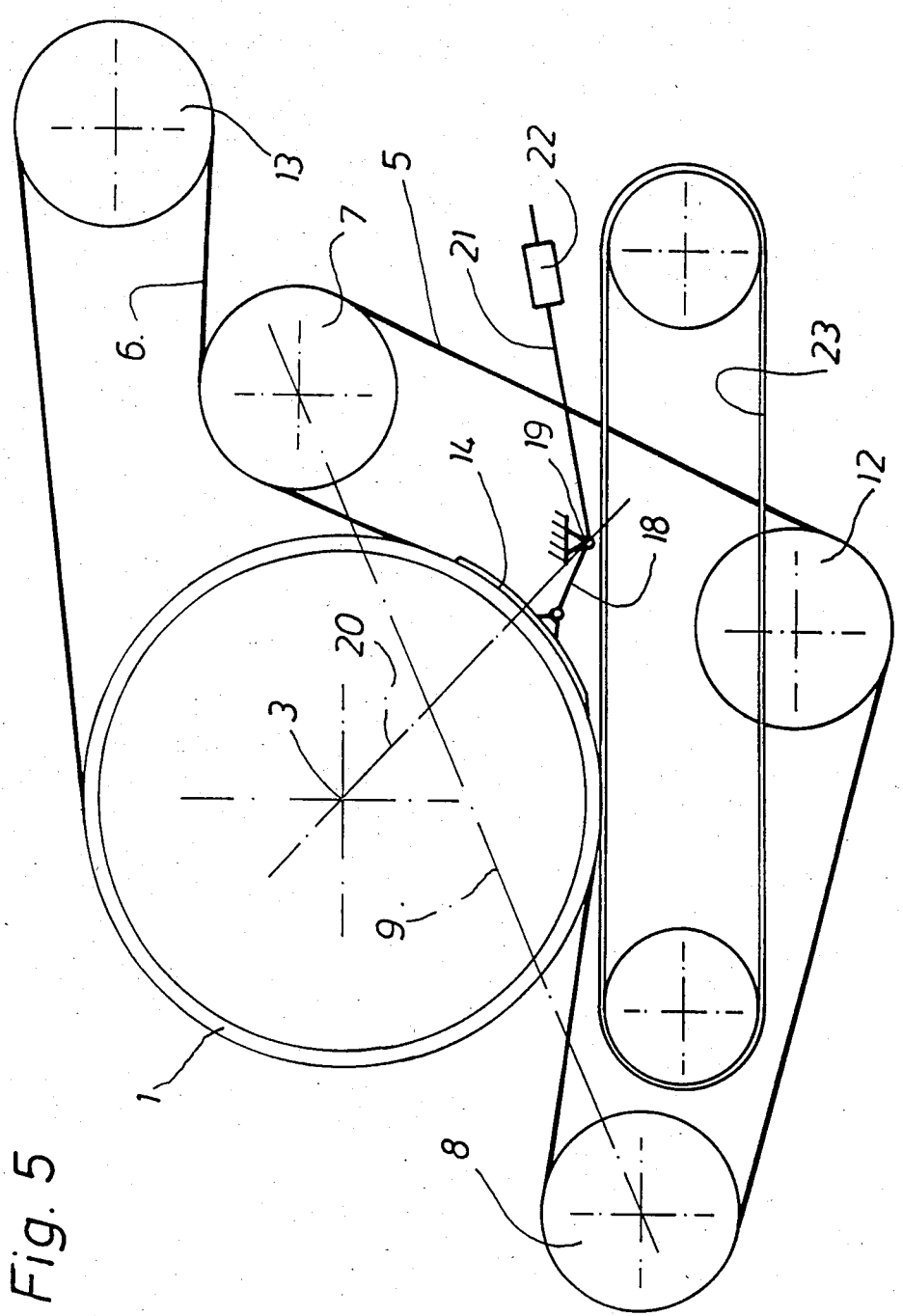
FIG. 5 shows a side view of the apparatus of FIGS. 1 and 2.

A drum 1 driven rotatingly in a suitable manner corresponding to the arrow of direction about a horizontal axis 3 is arranged in a not-shown frame. The drum has a circumferential surface 2 which is divided in the middle by a rotating rail groove 4. The groove 4 receives three round belts 5, 6 in such a manner that both outer belts 5 run essentially flush under the circumferential surface 2 and the middle round belt 6 runs below the circumferential surface by the width of its diameter. The circumferential surface 2 is provided with a gripping surface which can be achieved by a coating of an elastic burl band or by a corundum coating applied in a suitable manner.

One grooved pulley 7 and 8 each is arranged lying flush with the groove 4 in front of and behind the drum 1, respectively, in such a manner that a connecting line 9 of their axes 10 and 11 forms a secant with reference to the circumference of the drum 1. The pulley 7 is formed with three grooves for receiving the round belts 5 and 6, whereas the pulley 8 is formed with two grooves for receiving merely the round belts 5. The round belts 5 form an endless belt by deflection around at least one further grooved pulley 12 with two grooves, which endless belt surrounds the drum 1 between the pulleys 7 and 8 on part of its circumference pointing downwards. Therein the round belts 5 are guided in the groove 4 with their outside facing the bottom thereof. The free middle groove of the grooved pulley 7 serves to receive the round belt 6 functioning as a stripping belt, which round belt 6 surrounds the drum 1 in the middle groove of the same rotating endlessly and being deflected about a grooved pulley 13 having one groove. A skinning tool 14 is arranged fixedly in the region in which the drum 1 is surrounded by the round belt 6. This tool has the form of an isosceles triangle which is arranged symmetrically to the groove 4 and with its point 15 faces against the running direction of the circumferential surface 2 and lies flush against it. The equal sides, departing from the point 15, are formed as cutting edges 16 which extend over the whole width of the circumferential surface 2. A channel 17 whose width corresponds approximately to that of the groove 4 and covers the latter tunnel-like is positioned along the median between the cutting edges 16 on the surface of the skinning tool 14 facing the circumferential surface 2. The skinning tool 14 is held pressed against the circumferential surface via a guide rod 18 engaging the outside thereof flexibly and also in the plane of the median between the cutting edges 16 in a suitable manner. A support mounting 19 of the guide rod 18 is arranged attached to the frame in such a manner that, when seen in the direction of rotation of the circumferential surface 2, the point of engagement of the guide rod 18 on the skinning tool 14 lies in front of the connecting plane imagined through the axis of the drum 1 and the support mounting 19 and in front of the center of gravity of the triangular surface. The guide rod 18 is provided with a free lever 21 for receiving a moveably arranged weight 22 for producing the pressure force of the skinning tool 14 against the circumferential surface 2 of the drum 1. A divided conveyor of two expediently transversely elastic, flexible flat belts 23 is positioned beneath the drum 1 in the region of the groove 4, which flat belts 23 run with their conveying surfaces at a small distance below the outer surface of the skinning tool 14.

The skinning tool shown in FIG. 3 is divided into two tool elements 24, 25 which are held pressed in the manner as described for the one piece skinning tool 14 independently of each other.

The method of operation of the device is the following:

A double fillet 26 prepared as shown in FIG. 4 with flesh strips 27 cut free up to the inside of the skin and containing the fin holders of the dorsal fins is brought either manually or automatically from a filletting machine onto the round belts 5 in the region of or behind the pulley 8. Both round belts 5 penetrate the incision 30 separating both fillet halves 28 and 29 so that these hang down on both sides of the round belts 5 held together by the skin 31. When they reach the place at which the round belts 5 engage the drum 1 the round belts 5 are forced into the incisions 32 and 33 on both sides of the flesh strips 27 until they come to lie on the inside of the skin 31 and clamp this with respect to the bottom of the groove 4 of the drum 1. The skin 31 extends over the round belt 6 already positioned in the groove 4. In the further course of the conveying the fillet halves 28 and 29 reach the region of the flat belts 23 by which they are collected. Not-shown spreading plates, which effect a pre-spreading can be arranged in front of the pulley 8 or next to the round belts 5 up to their point of engagement with the drum 1. Supported by the flat belts 23 the double fillet 26 reaches the skinning tool 14 whose cutting edges 16 penetrate the incisions 32 and 33. The skin 31 is then separated from the fillet halves 28 and 29 by means of the cutting edges 16 arranged to diverge from each other symmetrically in relation to the groove 4 of the drum 1. Due to the pressure of the skinning tool 14 against the circumferential surface 2 of the drum 1 produced by means of the weight 22 the skin 31 with its whole surface remains under conveying engagement with the gripping surface of the circumferential surface 2. The skin free fillet halves 28 and 29 are carried away by means of the flat belts 23, while the skin 31 adhering to the gripping surface of the drum is lifted off the circumferential surface 2 by the round belt 6 going underneath it, and is guided over the pulley 7. From there it can be carried away by means of not-shown stripping devices.

Due to the structure of the skinning tool 14 according to FIG. 3 the skinning process can be more exactly controlled with regard to the critical initial phase of the cutting by independent adjustability of the pressure of the tool segment 24.

What is claimed is:

1. A device for processing fillets of fish provided in the form of pre-separated double fillets by skinning, which double fillets are composed of two fish fillet portions which are covered by skin defining an inside facing said fillet portions as well as an outside opposed thereto and adhere to each other by means of a flesh strip comprising fin holders of dorsal fins of said fish, said flesh strip being partially disconnected from said fillet portions by a pre-separating incision up to said inside of said skin leaving said skin essentially undamaged, said device comprising:

a. drum means driven to rotate about an essentially horizontal axis in a selected direction of rotation, defining a circumferential surface and supporting said double fillets lying on said outside of said skin, said circumferential surface being provided with two groove means arranged next to each other for receiving a pair of flexible holding belt means surrounding a part of said circumferential surface, b. a skinning tool having a central plane of symmetry and a center of gravity in said plane of symmetry, and having an inner surface shaped to make flush engagement with the circumferential surface of said drum, and an outer surface, said skinning tool having cutting edges extending substantially symmetrically to said plane of symmetry and diverging in said direction of rotation of said drum, c. mounting means movably mounting said skinning tool adjacent to said drum and including a member pivotally mounted on the outer surface of said skinning tool at one point on said plane of symmetry and upstream of said center of gravity, whereby to allow free adaptation between the inner surface of said skinning tool and the circumferential surface of said drum, and d. pressure means biasing said mounting means in a direction to press said skinning tool radially against said circumferential surface under a defined pressing force.

2. A device as claimed in claim 1, wherein said skinning tool is guided via a guide rod pivotable about support mounting means attached to said device, said guide rod engaging said skinning tool at a point lying, when seen in said direction of rotation of said drum means, in front of an imaginary connecting plane extending through said axis of said drum means and said support mounting means of said guide rod.

3. A device as claimed in claim 1, wherein said pressure means comprise a weight engaging said mounting means.

4. A device as claimed in claim 2, wherein said pressure means comprise a weight engaging said guide rod.

5. A device as claimed in claim 1, wherein said skinning tool is separated transversely into two portions, each of which is guided independently and held pressed against said circumferential surface.

6. A device as claimed in claim 2, wherein said skinning tool is separated transversely into two portions, each of which is guided for itself and held pressed against said circumferential surface.

7. A device as claimed in claim 1 which also includes third round belt means acting as a stripping belt and having a substantially round cross section, wherein said groove means in said circumferential surface are arranged to receive said third round belt means.

8. A device as claimed in claim 7, wherein said third belt means are guided such that, together with said holding belt means they form an inlet wedge ending at a position at which said holding belt means engage said drum and that a position at which said third belt means disengage said drum is identical with the corresponding position of disengagement of said holding belt means.

* * * * *